US011276376B2

(12) United States Patent
He et al.

(10) Patent No.: US 11,276,376 B2
(45) Date of Patent: Mar. 15, 2022

(54) SYSTEM AND METHOD FOR 3D DISPLAY OF DYNAMIC OBJECTS ON SYNTHETIC VISION SYSTEM IN COCKPIT DISPLAY SYSTEM

(71) Applicant: HONEYWELL INTERNATIONAL INC., Morris Plains, NJ (US)

(72) Inventors: Zuowei He, Phoenix, AZ (US); Gang He, Morristown, NJ (US); Thea Feyereisen, Hudson, WI (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/891,660

(22) Filed: Jun. 3, 2020

(65) Prior Publication Data
US 2020/0394985 A1 Dec. 17, 2020

Related U.S. Application Data

(60) Provisional application No. 62/861,415, filed on Jun. 14, 2019.

(51) Int. Cl.
*G09G 5/373* (2006.01)
*G09G 5/38* (2006.01)
(Continued)

(52) U.S. Cl.
CPC ......... *G09G 5/373* (2013.01); *G06K 9/00671* (2013.01); *G06T 7/70* (2017.01);
(Continued)

(58) Field of Classification Search
CPC ..... G06T 15/005; G06T 11/001; G06T 11/40; G06T 19/00; G06T 11/60; G06T 17/20;
(Continued)

(56) References Cited

U.S. PATENT DOCUMENTS

| 2003/0151630 A1 | 8/2003 | Kellman et al. |
| 2004/0165010 A1 * | 8/2004 | Robertson ............. G06F 3/0481 |
| | | 715/805 |

(Continued)

FOREIGN PATENT DOCUMENTS

| EP | 0493822 A1 | 7/1992 |
| EP | 3211376 A1 | 8/2017 |
| WO | WO-2015087589 A1 * | 6/2015 ............. G01W 1/00 |

*Primary Examiner* — Todd Buttram
(74) *Attorney, Agent, or Firm* — Lorenz & Kopf, LLP

(57) ABSTRACT

A method for displaying objects in an aerial vehicle is disclosed. The method includes: determining if sensed objects or calculated virtual objects around the travel path of the aerial vehicle are within a field of view of a three-dimensional view in front of the aerial vehicle displayed on a display screen in the aerial vehicle; selecting, for each graphical object representing an object within the field of view of the three-dimensional view, a graphical object display size for the object, wherein the display size of an object is determined based on a non-linear projection per distance between the object and the view point that is scaled based on a continuous, non-linear scaling function, which causes the object to be displayed smaller at certain distances and larger at other distances than it would if linear scaling alone were applied; causing the display of the one or more graphical objects with the selected display size.

20 Claims, 17 Drawing Sheets

(51) Int. Cl.
  *G06T 7/70* (2017.01)
  *G06K 9/00* (2006.01)
  *G06T 15/20* (2011.01)

(52) U.S. Cl.
  CPC ............... *G06T 15/20* (2013.01); *G09G 5/38* (2013.01); *G06T 2207/30252* (2013.01); *G09G 2354/00* (2013.01); *G09G 2380/12* (2013.01)

(58) Field of Classification Search
  CPC ......... G06T 17/00; G06T 15/10; G06T 15/00; G06T 17/10; G06T 17/005
  See application file for complete search history.

(56) References Cited

U.S. PATENT DOCUMENTS

| | | |
|---|---|---|
| 2009/0265088 A1 | 10/2009 | Dias et al. |
| 2010/0082184 A1 | 4/2010 | Nichols et al. |
| 2010/0097241 A1* | 4/2010 | Suddreth ................. G08G 5/04 340/972 |

\* cited by examiner

SYSTEM AND METHOD FOR 3D DISPLAY OF DYNAMIC OBJECTS ON SYNTHETIC VISION SYSTEM IN COCKPIT DISPLAY SYSTEM

CROSS-REFERENCE TO RELATED APPLICATION

This application claims the benefit of U.S. Provisional Application No. 62/861,415 filed Jun. 14, 2019, which is incorporated into the present application by reference.

TECHNICAL FIELD

Embodiments of the subject matter described herein relate generally to three dimensional display systems. More particularly, embodiments of the subject matter relate to sizing objects displayed on three dimensional display systems.

BACKGROUND

A synthetic vision system (SVS) is a computer-mediated reality system for aerial vehicles, that uses a 3D perspective view to provide pilots with clear and intuitive means of understanding their flying environment. Synthetic vision provides situational awareness to the operators by using terrain, obstacle, geo-political, hydrological and other databases. A typical SVS application uses a set of databases stored on board the aircraft, an image generator computer, and a display. A navigation solution is obtained through the use of GPS and inertial reference systems. If perspective view projection per distance between an object and a view point for the object is used, the size of the displayed object at the view point may be scaled to be proportional to the distance. This can lead to the display size of the object being too large for proper visualization when the object is close to the aircraft and too small for proper visualization when the object is far away from the aircraft.

Hence, it is desirable to provide a system and method that applies a scaling algorithm for 3D display of dynamic objects for dynamic/optimal sizing of objects based on visual condition/requirement. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a display system for displaying a three-dimensional view in front of an aerial vehicle is disclosed. The display system includes a display screen for displaying the three-dimensional view, one or more sensors for obtaining object data regarding objects within the travel path of the aerial vehicle, and a controller for receiving the object data from the one or more sensors and for providing input to the display screen. The controller is configured by programming instructions on non-transitory computer readable media to: cause the display of one or more objects as graphical objects in a 3-dimensional graphical representation of real space, wherein the display size of an object is determined based on a non-linear projection per distance between the object and view point that is scaled based on a continuous, non-linear scaling function, which causes the object to be displayed smaller at certain distances and larger at other distances than it would if only linear scaling were applied. This may allow the display size of the object to not be too big when the object is close to the aerial vehicle and to not be too small when the object is far away from the aerial vehicle.

In another embodiment, a method for displaying objects in the travel path of an aerial vehicle is disclosed. The method includes: obtaining object data regarding sensed objects around the travel path of the aerial vehicle from one or more sensors on the aerial vehicle; determining if the sensed objects are within a field of view of a three-dimensional view in front of the aerial vehicle displayed on a display screen in the aerial vehicle; selecting, for each graphical object representing an object within the field of view of the three-dimensional view, a graphical object display size for the object, wherein the display size of an object is determined based on a non-linear projection per distance between the object and the view point that is scaled based on a continuous, non-linear scaling function, which causes the object to be displayed smaller at certain distances and larger at other distances than it would if only linear scaling were applied; causing the display on the display screen of the one or more graphical objects with the selected display size. This may allow the display size of the object to not be too big when the object is close to the aerial vehicle and to not be too small when the object is far away from the aerial vehicle.

In another embodiment, a method for displaying objects in the travel path of an aerial vehicle is disclosed. The method includes: obtaining object data regarding a calculated virtual object around the travel path of the aerial vehicle from one or more aerial vehicle sensors; determining if the calculated virtual object is within a field of view of a three-dimensional view in front of the aerial vehicle displayed on a display screen in the aerial vehicle; selecting, for a graphical object representing the calculated virtual object within the field of view of the three-dimensional view, a graphical object display size for the object, wherein the display size of an object is determined based on a non-linear projection per distance between the object and the view point that is scaled based on a continuous, non-linear scaling function, which causes the object to be displayed smaller at certain distances and larger at other distances than it would if only linear scaling were applied; and causing the display on the display screen of the graphical object with the selected display size. This may allow the display size of the object to not be too big when the object is close to the aerial vehicle and to not be too small when the object is far away from the aerial vehicle.

In another embodiment, non-transitory computer readable media encoded with processor executable programming instructions is disclosed. When the processor executable programming instructions are executed by a processor, a method is performed. The method includes: obtaining object data regarding sensed objects around the travel path of the aerial vehicle from one or more aerial vehicle sensors; determining if the sensed objects are within a field of view of a three-dimensional view in front of the aerial vehicle displayed on a display screen in the aerial vehicle; selecting, for each graphical object representing an object, a graphical object display size for the object, wherein the display size of an object is determined based on a non-linear projection per distance between the object and the view point that is scaled based on a continuous, non-linear scaling function, which causes the object to be displayed smaller at certain distances and larger at other distances than it would if only linear scaling were applied; and causing the display of the one or more graphical objects on the display screen. This may allow the display size of the object to not be too big when the object is close to the aerial vehicle and to not be too small when the object is far away from the aerial vehicle.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
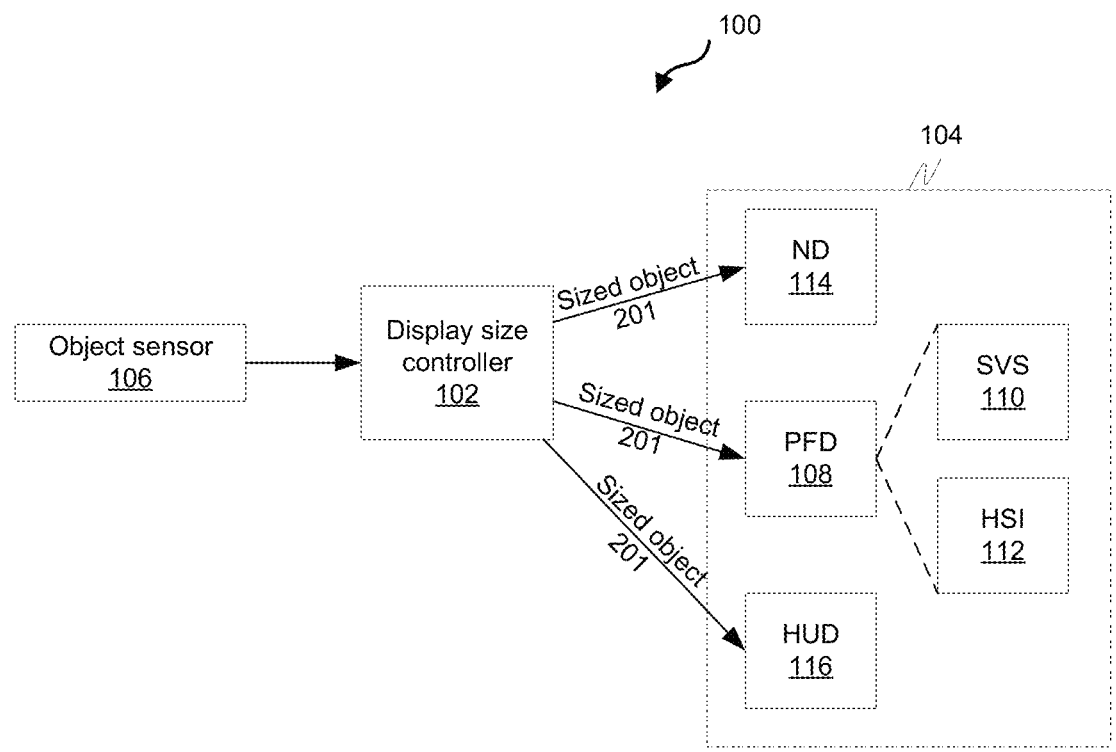
FIG. 1 is a block diagram depicting a display system for displaying a three-dimensional view in front of an aerial vehicle, in accordance with some embodiments.

FIG. 1 is a block diagram depicting an example display system 100 for displaying a three-dimensional view in front of an aerial vehicle, such as an airplane, helicopter, UAV or other aircraft. The example display system 100 includes a display size controller 102, one or more displays 104, and one or more object sensors 106. The one or more displays 104 may include a primary flight display (PFD) 108, which may display a three-dimensional (3-D) synthetic vision system (SVS) 110 and a two-dimensional (2-D) horizontal situation indicator (HSI) 112. The one or more displays 104 may also include a navigational display (ND) 114, which may display 2-D and 3-D content, and a HUD 116, which may also display 2-D and 3-D content. The one or more object sensors 106 are for obtaining object data regarding objects within the travel path of the aerial vehicle so that the objects may be displayed in the field of view of one or more of the displays 104. The object sensors may comprise airborne vehicle sensors such as ADSB receivers, radar, lidar, cameras, and others.

The display size controller 102 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller 102.

The display size controller 102 is configured by programming instructions on non-transitory computer readable media to: cause the display of one or more objects as graphical objects in a 3-dimensional graphical representation of real space, wherein the display size of an object is determined based on a non-linear projection per distance between the object and view point that is scaled based on a continuous, non-linear scaling function, which causes the object to be displayed smaller at certain distances and larger at other distances than it would if only linear scaling (e.g., inverse linear scaling performed by an inverse linear function) were applied. This may allow the display size of the object to not be too big when the object is close to the aircraft and to not be too small when the object is far away from the aircraft.

As used herein a linear function (which includes an inverse linear function) is a function whose graph is a straight line, that is a polynomial function of degree one or zero. A non-linear function is a function whose graph is not a straight line.

The continuous, non-linear scaling function may include one or more different compensation scaling functions. In this example, the plurality of different compensation scaling functions includes a first compensation scaling function for normal conditions and a second compensation scaling function for alert or bad visual conditions. In this example, the first compensation scaling function used to calculate a scaling factor for a specific distance x is $d_1(a+(d*x-b)/(e*x+c))$, wherein $d_1$, a, b, c, d and e are constants and x is the distance from the object to the view point. In this example, the second compensation scaling function used to calculate a scaling factor for a specific distance x is $d_2(a+(d*x-b)/(e*x+c))$, wherein $d_2$, a, b, c, d and e are constants, $d_2$ is not equal to $d_1$, and x is the distance from the object to the view point. In this example, $d_2 > d_1$, thereby causing the display size of objects at a certain distance to be larger when the second compensation scaling function is used versus when the first compensation scaling function is used. In this example, the display size of an object is determined by a linear projection scaling function (an inverse linear scaling function in particular) plus one of the plurality of different compensation scaling functions. In this example, the inverse linear projection scaling function comprises 1/x, where x is the distance from the object to the view point.

In this example, the display system 100 is a flight deck display system on board an aircraft. In this example, the flight deck display system 100 includes a PFD 108. In this example, the display 100 includes a synthetic vision system 110 displayed on a PFD 108.

The controller 102 is further configured to detect a threat level posed by a detected object and adjust the position of the object on the display 104 based on the determined threat level. The controller 102 may adjust the position of the object further away from the center of the projected travel path of the aerial vehicle (e.g., aircraft) when the threat level is considered low. The controller 102 may adjust the position the object closer to the center of the projected travel path of the aircraft when the threat level is considered high. The travel path of the aircraft may be along a runway and the controller 102 may adjust the position of the object further away from the center of the runway when the threat level is considered low. The controller 102 may adjust the position of the object closer to the center of the runway when the threat level is considered high.

Figure 2:
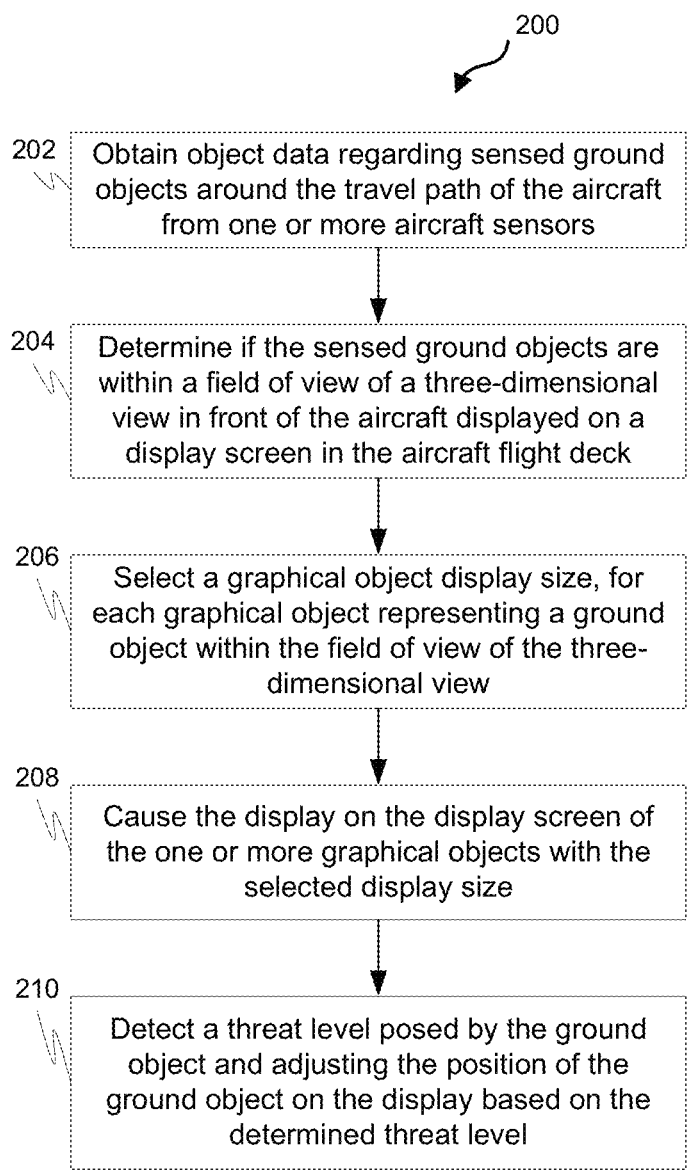
FIG. 2 is a process flow chart depicting an example process for displaying ground objects in the travel path of an aircraft, in accordance with some embodiments.

FIG. 2 is a process flow chart depicting an example process for displaying ground objects in the travel path of an aircraft. The order of operation within the process 200 is not limited to the sequential execution as illustrated in the figure, but may be performed in one or more varying orders as applicable and in accordance with the present disclosure.

The example process 200 includes obtaining object data regarding sensed ground objects around the travel path of the aircraft from one or more aircraft sensors (operation 202). The object data may be obtained, for example, from an object sensor 106.

The example process 200 includes determining if the sensed ground objects are within a field of view of a three-dimensional view in front of the aircraft displayed on a display screen in the aircraft flight deck (operation 204). The display screen, for example, may be from a display system 104, which may include a primary flight display (PFD) 108, a three-dimensional (3-D) synthetic vision system (SVS) 110, a two-dimensional (2-D) horizontal situation indicator (HSI) 112, a navigational display (ND) 114, and/or a HUD 116.

The example process 200 includes selecting a graphical object display size, for each graphical object representing a ground object within the field of view of the three-dimensional view (operation 206). This includes selecting, for each graphical object representing a ground object within the field of view of the three-dimensional view, a graphical object display size for the ground object, wherein the display size of a ground object is determined based on a non-linear projection per distance between the ground object and the view point that is scaled based on a continuous, non-linear scaling function, which causes the ground object to be displayed smaller at certain distances and larger at other distances than it would if only linear scaling (e.g., inverse linear scaling performed by an inverse linear function) were applied, so that the display size of the object is not too big when the ground object is close to the aircraft and not too small when the ground object is far away from the aircraft.

The continuous, non-linear scaling function may include one of a plurality of different compensation scaling functions. The plurality of different compensation scaling functions may include a first compensation scaling function for normal conditions and a second compensation scaling function for alert or bad visual conditions. The first compensation scaling function used to calculate a scaling factor for a specific distance x may be $d_1(a+(d*x-b)/(e*x+c))$, wherein $d_1$, a, b, c, d and e are constants and x is the distance from the object to the view point. The second compensation scaling function used to calculate a scaling factor for a specific distance x may be $d_2(a+(d*x-b)/(e*x+c))$, wherein $d_2$, a, b, c, d and e are constants, $d_2$ is not equal to $d_1$, and x is the distance from the object to the view point. $d_2$ may be $> d_1$, thereby causing the display size of objects at a certain distance to be larger when the second compensation scaling function versus when the first compensation scaling function is used. The display size of an object may be determined by an inverse linear projection scaling function plus one of the plurality of different compensation scaling functions. The inverse linear projection scaling function may include 1/x, where x is the distance from the object to the view point.

The example process 200 includes causing the display on the display screen of the one or more graphical objects with the selected display size (operation 208).

The example process 200 may further include detecting a threat level posed by the ground object and adjusting the position of the ground object on the display based on the determined threat level (operation 210). The adjusting may include adjusting the position of the ground object further away from the center of the projected travel path of the aircraft when the threat level is considered low. The adjusting may further include adjusting the position of the object closer to the center of the projected travel path of the aircraft when the threat level is considered high. The travel path of the aircraft may be along a runway and the adjusting further may include adjusting the position of the object further away from the center of the runway when the threat level is considered low. The adjusting may further include adjusting the position of the object closer to the center of the runway when the threat level is considered high.

Non-transitory computer readable media encoded with processor executable programming instructions is disclosed (e.g., part of controller 102). When the processor executable programming instructions are executed by a processor, a method (e.g., process 200) is performed. The method includes: obtaining object data regarding sensed objects around the travel path of the aircraft from one or more aircraft sensors; determining if the sensed objects are within a field of view of a three-dimensional view in front of the aircraft displayed on a display screen in the aircraft; selecting, for each graphical object representing an object, a graphical object display size for the object, wherein the display size of an object is determined based on a non-linear projection per distance between the object and the view point that is scaled based on a continuous, non-linear scaling function, which causes the object to be displayed smaller at certain distances and larger at other distances than it would if only linear scaling were applied, wherein the display size of the object is not too big when the object is nearby to the aircraft and not too small when the object is far away; and causing the display of the one or more graphical objects on the display screen.

FIGS. 3, 5, 7, 9, 11 are diagrams depicting a detected ground object overlaid on a 3-D view in front of an aircraft, with linear scaling applied for sizing the ground object. FIGS. 4, 6, 8, 10, 12 are diagrams depicting a detected ground object overlaid on a 3-D view in front of an aircraft, with non-linear scaling applied for sizing the ground object.

Figure 3:
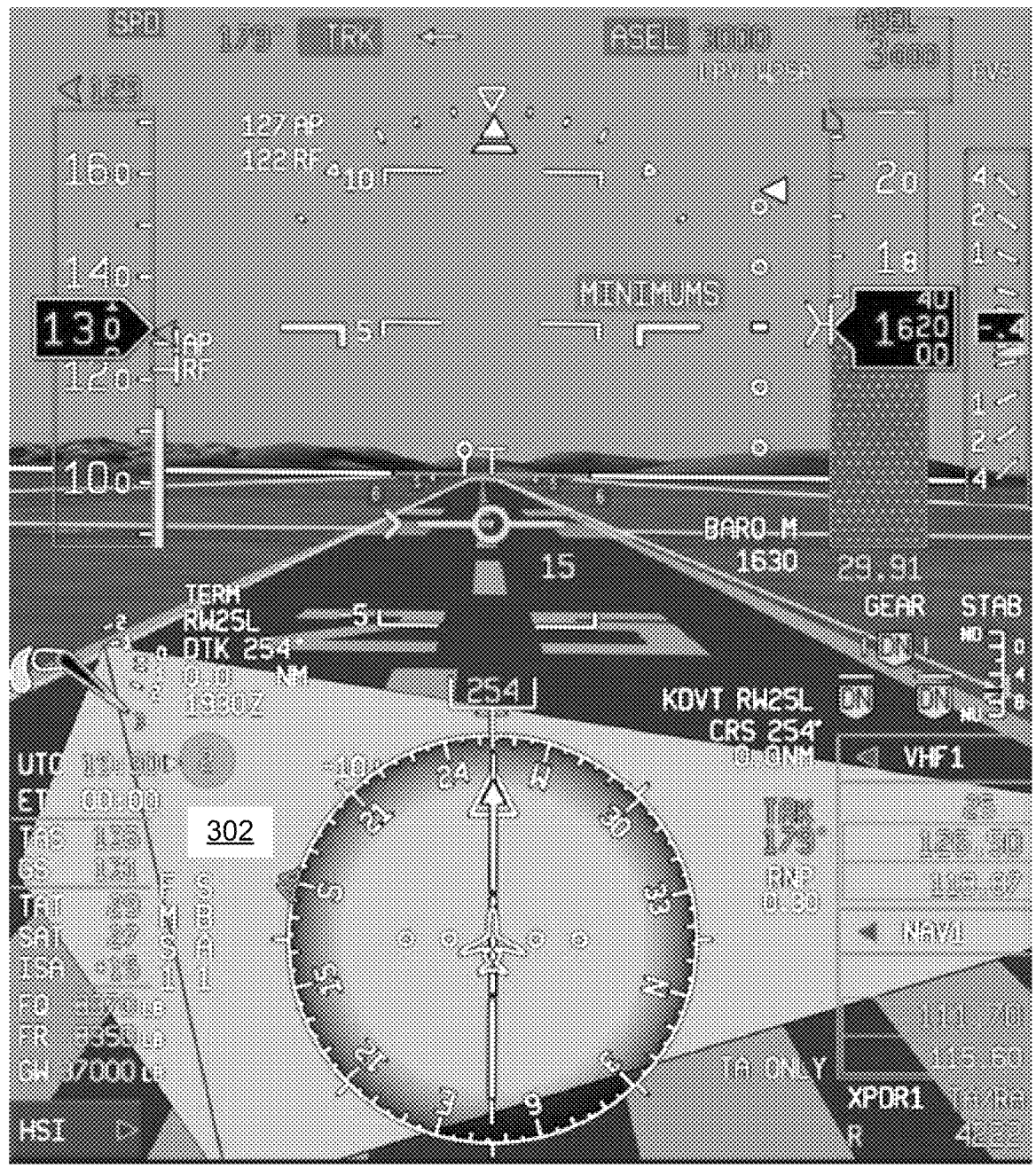
FIGS. 3, 5, 7, 9, 11 are diagrams depicting a detected ground object overlaid on a 3-D view in front of an aircraft, with linear scaling applied for sizing the ground object, in accordance with some embodiments.
Figure 4:
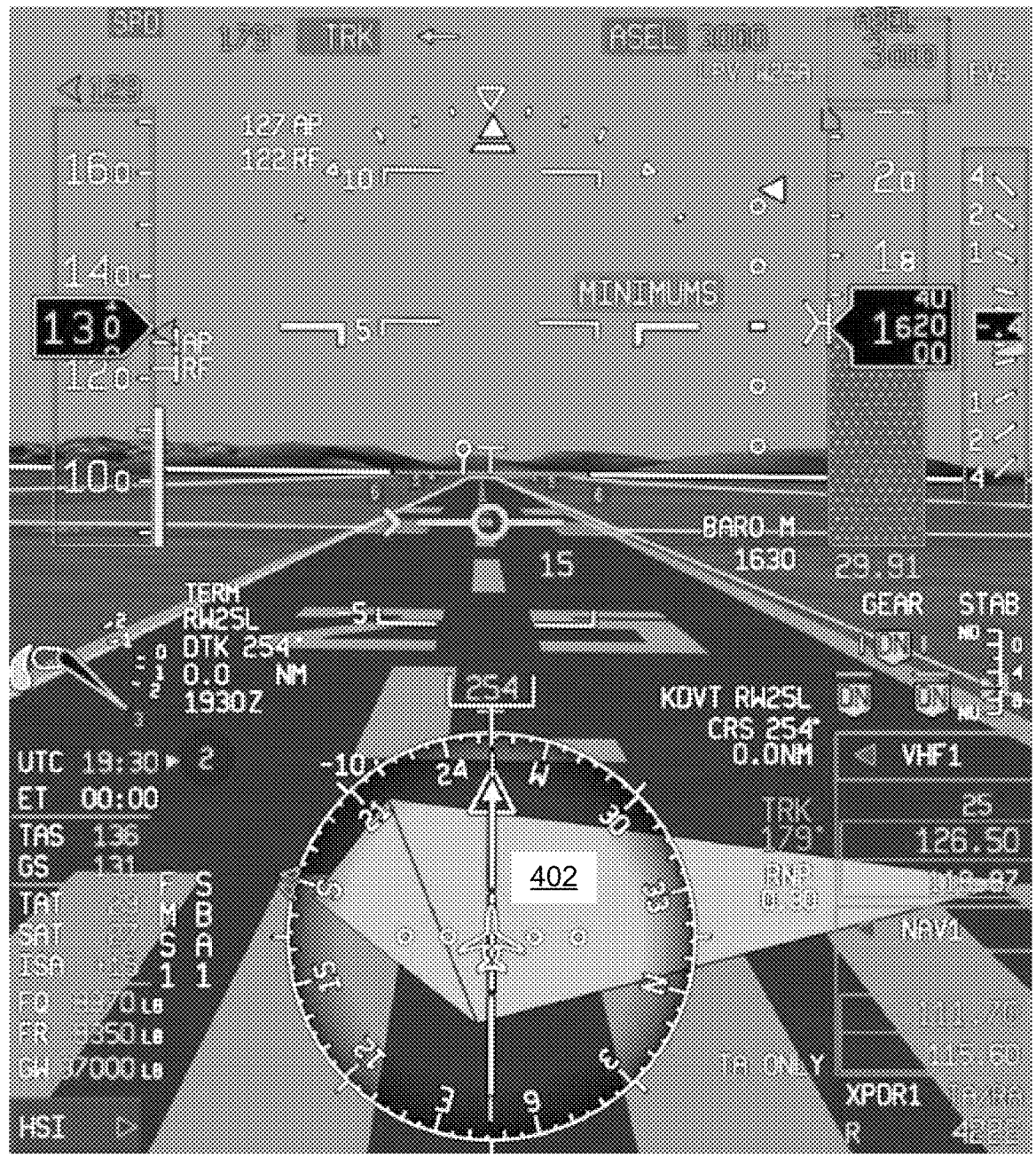
FIGS. 4, 6, 8, 10, 12 are diagrams depicting a detected ground object overlaid on a 3-D view in front of an aircraft, with non-linear scaling applied for sizing the ground object, in accordance with some embodiments.

FIG. 3 illustrates the display on an SVS display of an example 3-D object 302 that is 50 feet from the view point with only an inverse linear projection function applied for sizing. FIG. 4 illustrates the display on an SVS display of the same example 3-D object 402 that is 50 feet from the view point with both an inverse linear projection function and a compensation scaling function applied for sizing. In this example, the object 402 is displayed smaller than the object 302 since the objects are closer to the aircraft.

Figure 5:
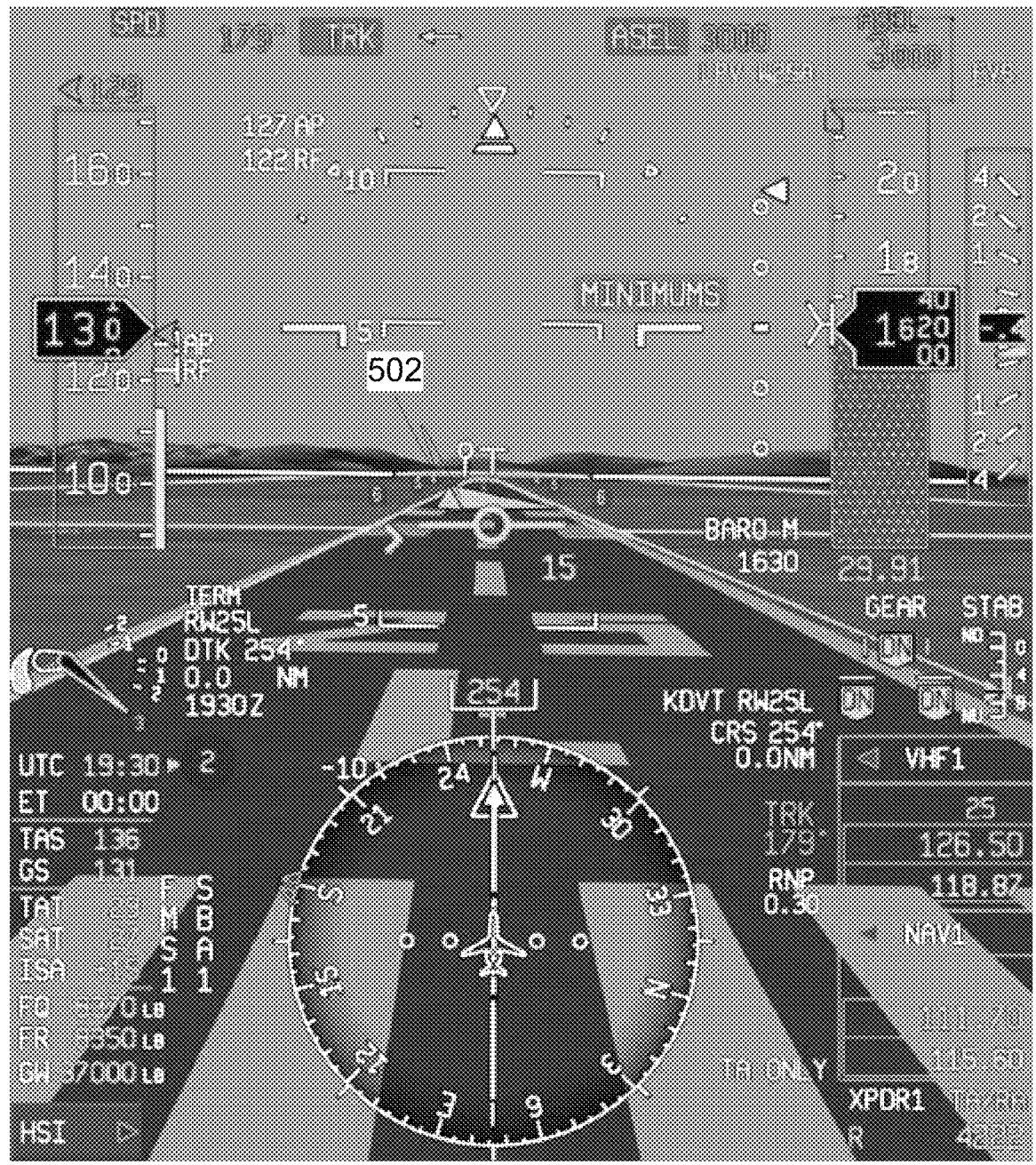
Figure 6:
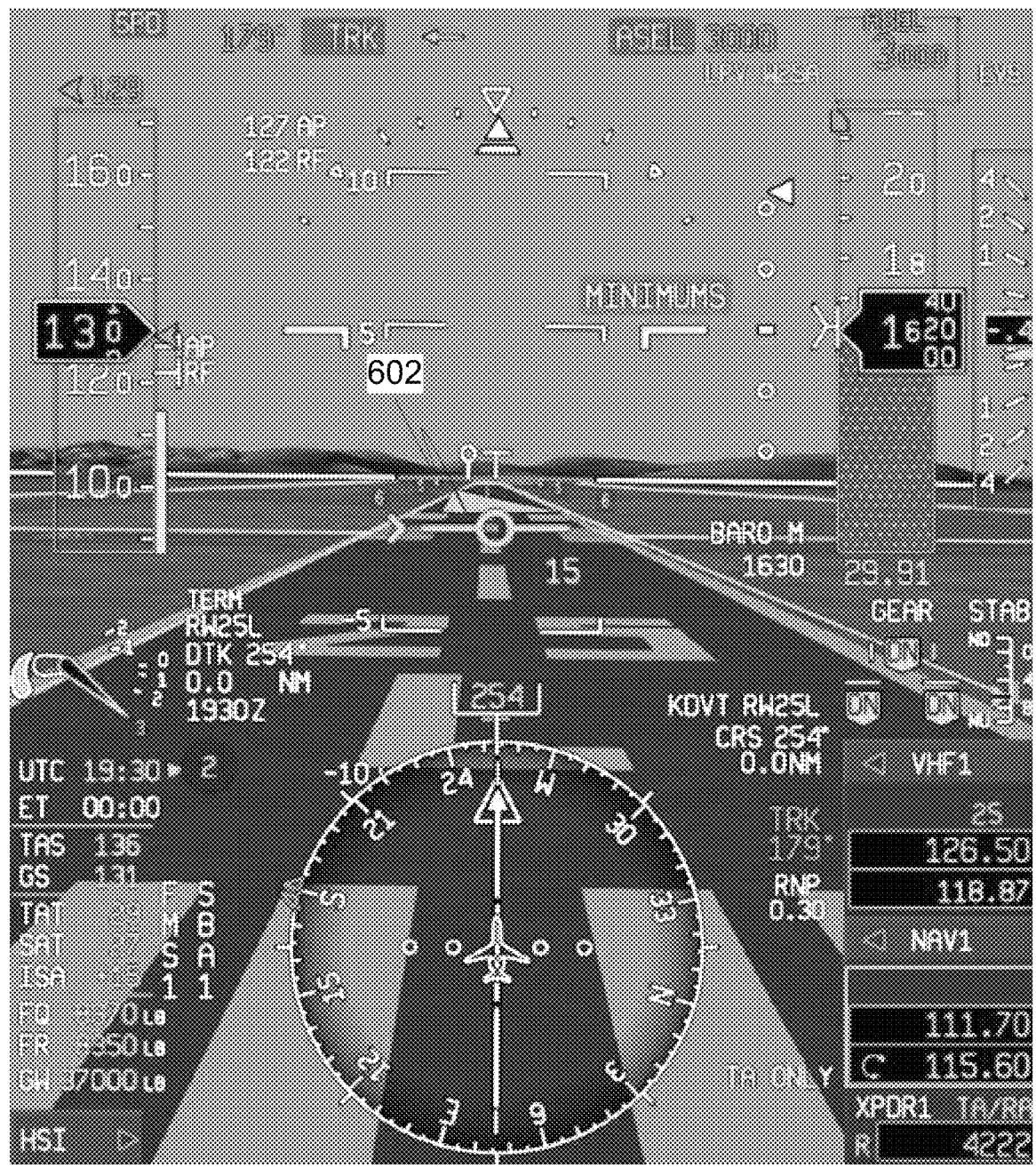

FIG. 5 illustrates the display on an SVS display of an example 3-D object 502 that is 1000 feet from the view point with only an inverse linear projection function applied for sizing. FIG. 6 illustrates the display on an SVS display of the same example 3-D object 602 that is 1000 feet from the view point with both an inverse linear projection function and a compensation scaling function applied for sizing. In this example, the object 502 and 602 are displayed at approximately the same size.

Figure 7:
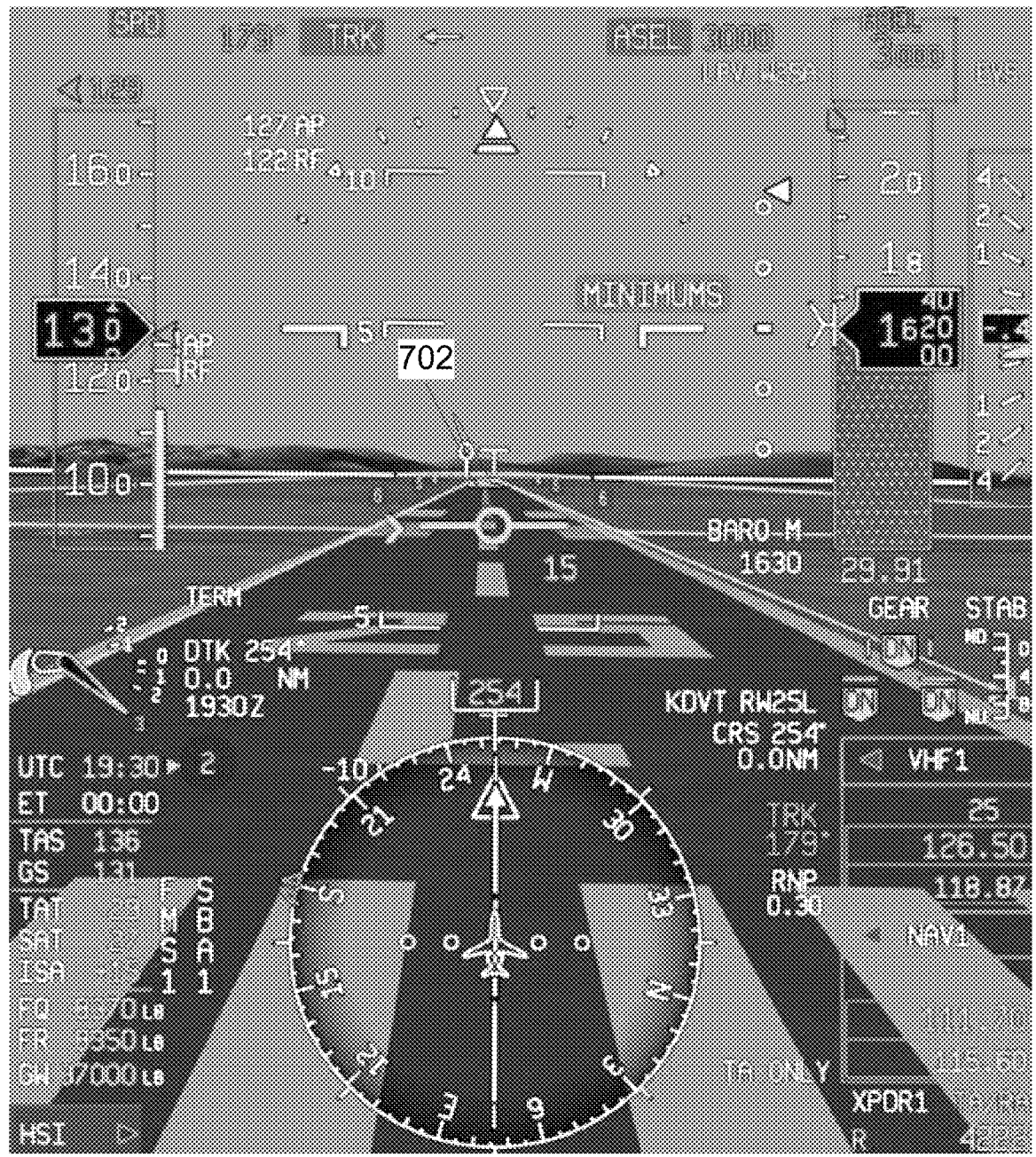
Figure 8:
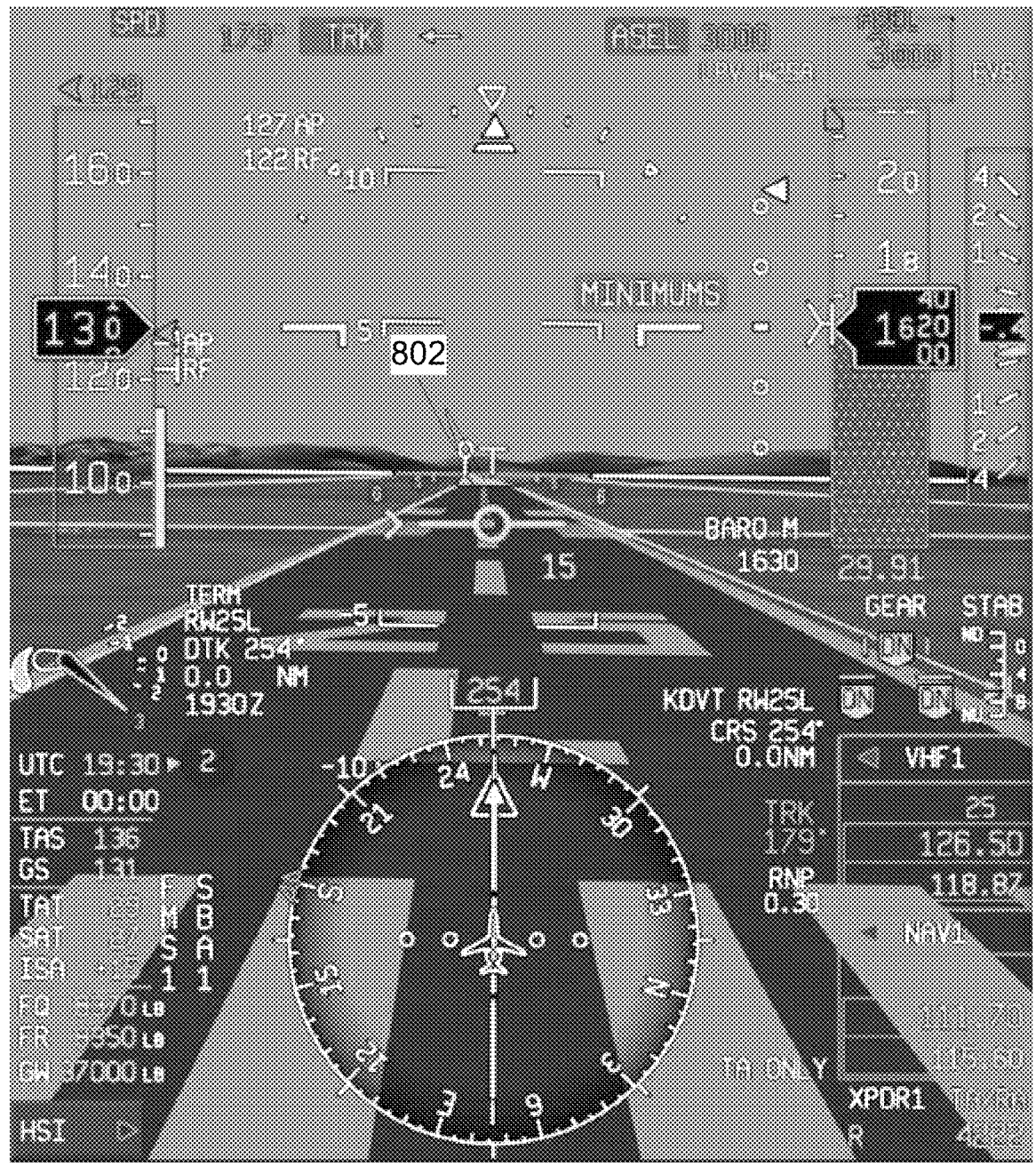

FIG. 7 illustrates the display on an SVS display of an example 3-D object 702 that is 3000 feet from the view point with only an inverse linear projection function applied for sizing. FIG. 8 illustrates the display on an SVS display of the same example 3-D object 802 that is 3000 feet from the view point with both an inverse linear projection function and a compensation scaling function applied for sizing. In this example, the object 802 is displayed larger than the object 702 since the objects are further away from the aircraft.

Figure 9:
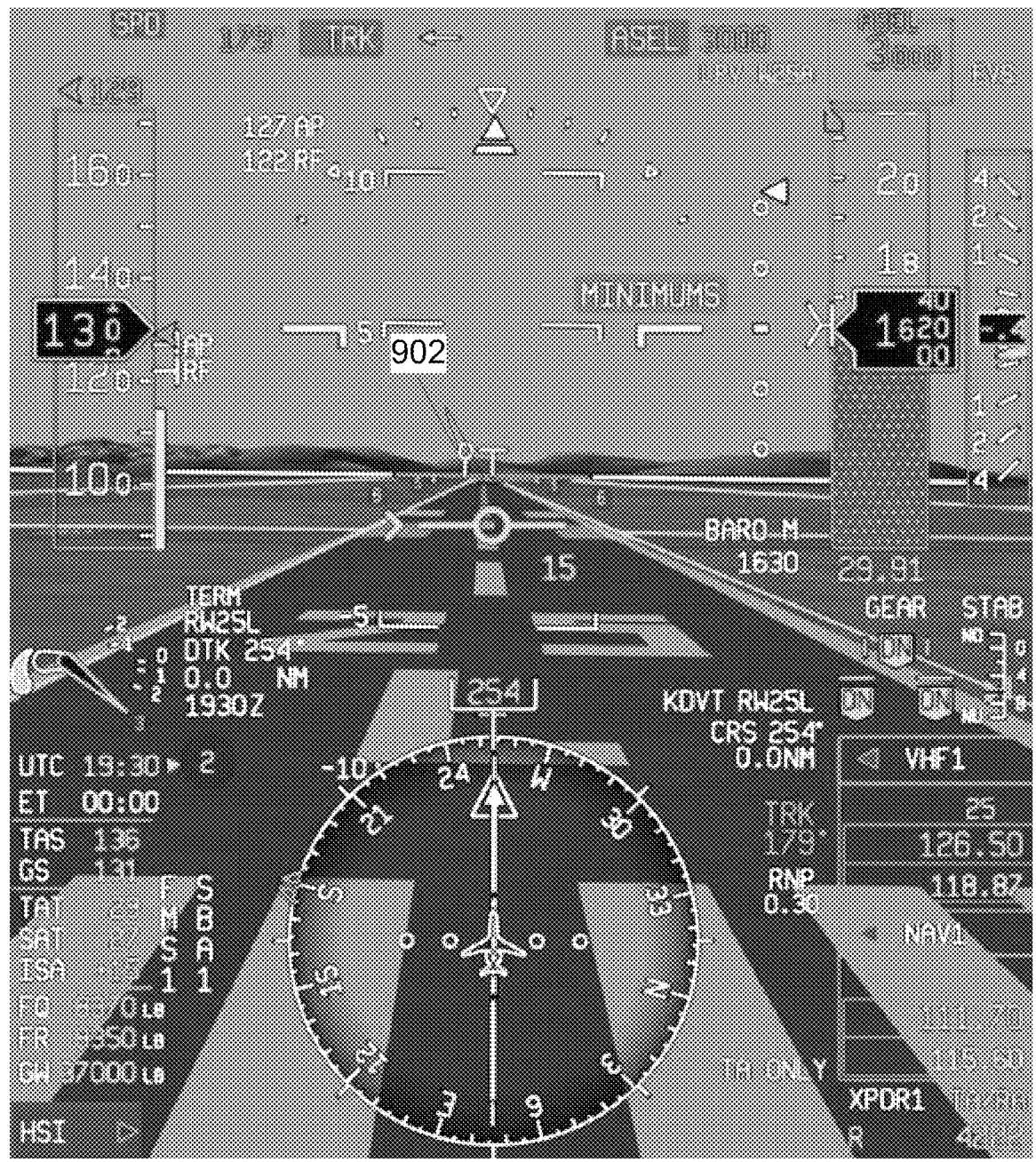
Figure 10:
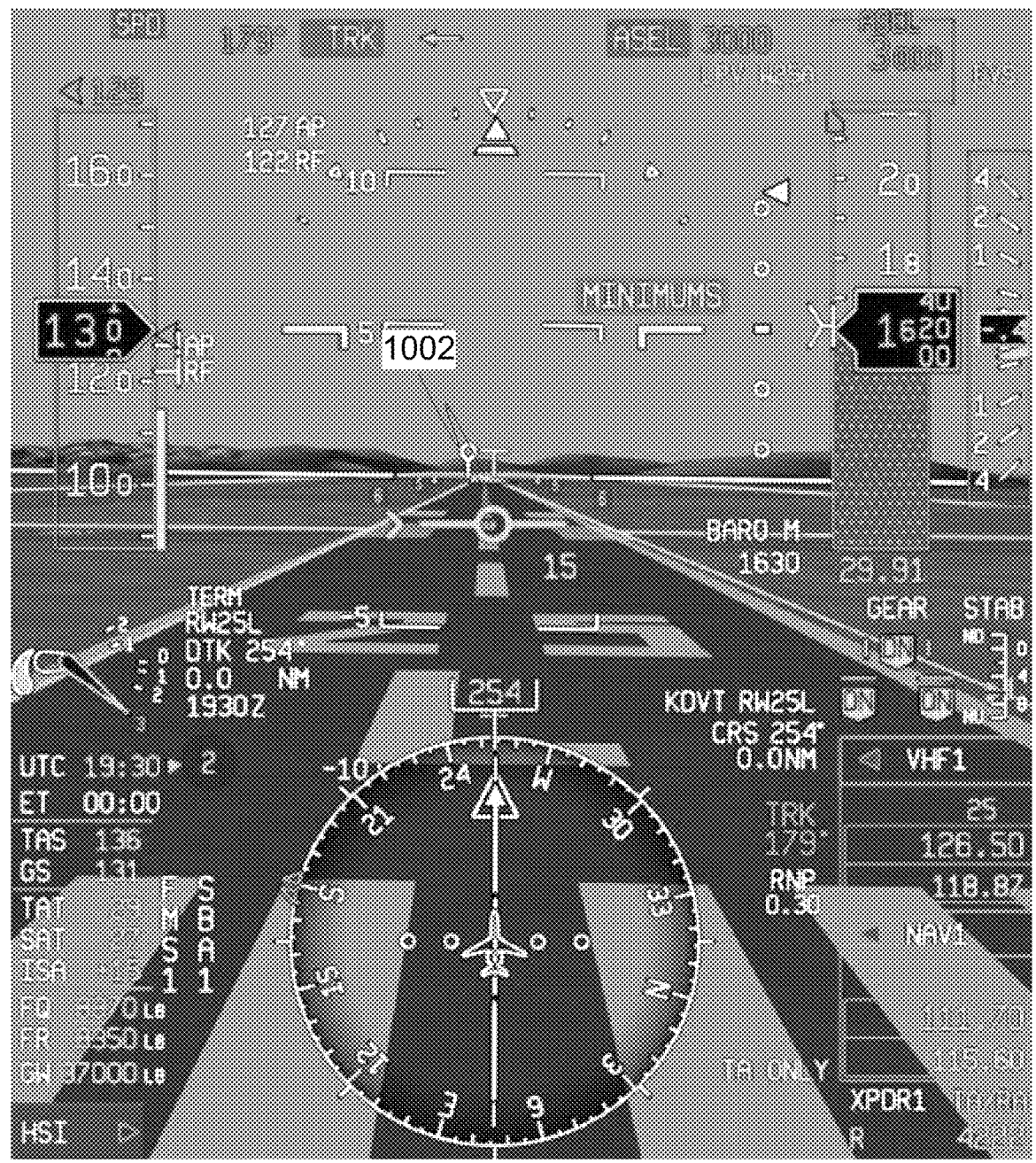

FIG. 9 illustrates the display on an SVS display of an example 3-D object 902 that is 5000 feet from the view point with only an inverse linear projection function applied for sizing. FIG. 10 illustrates the display on an SVS display of the same example 3-D object 1002 that is 5000 feet from the view point with both an inverse linear projection function and a compensation scaling function applied for sizing. In this example, the object 1002 is displayed larger than the object 902 since the objects are further away from the aircraft.

Figure 11:
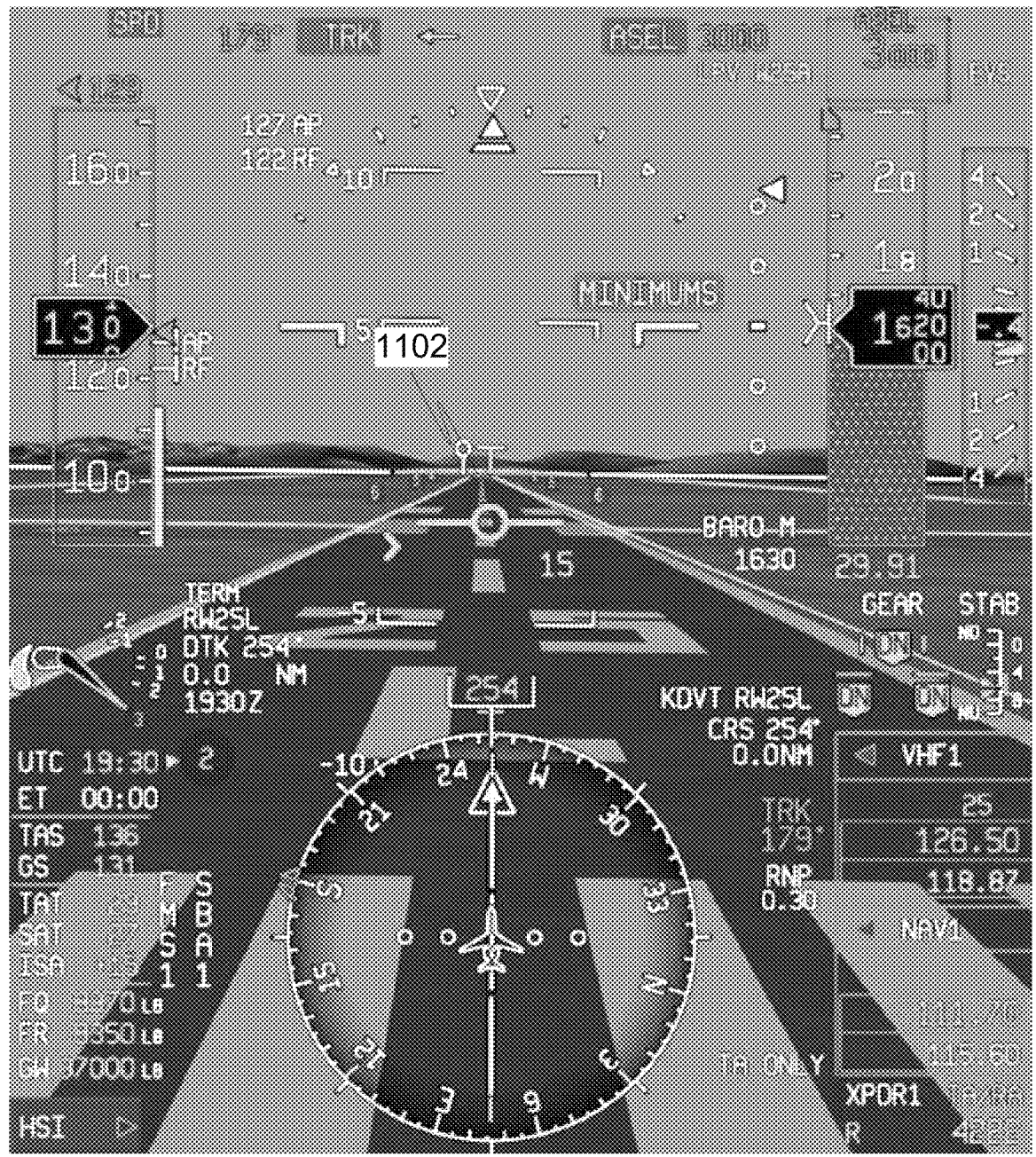
Figure 12:
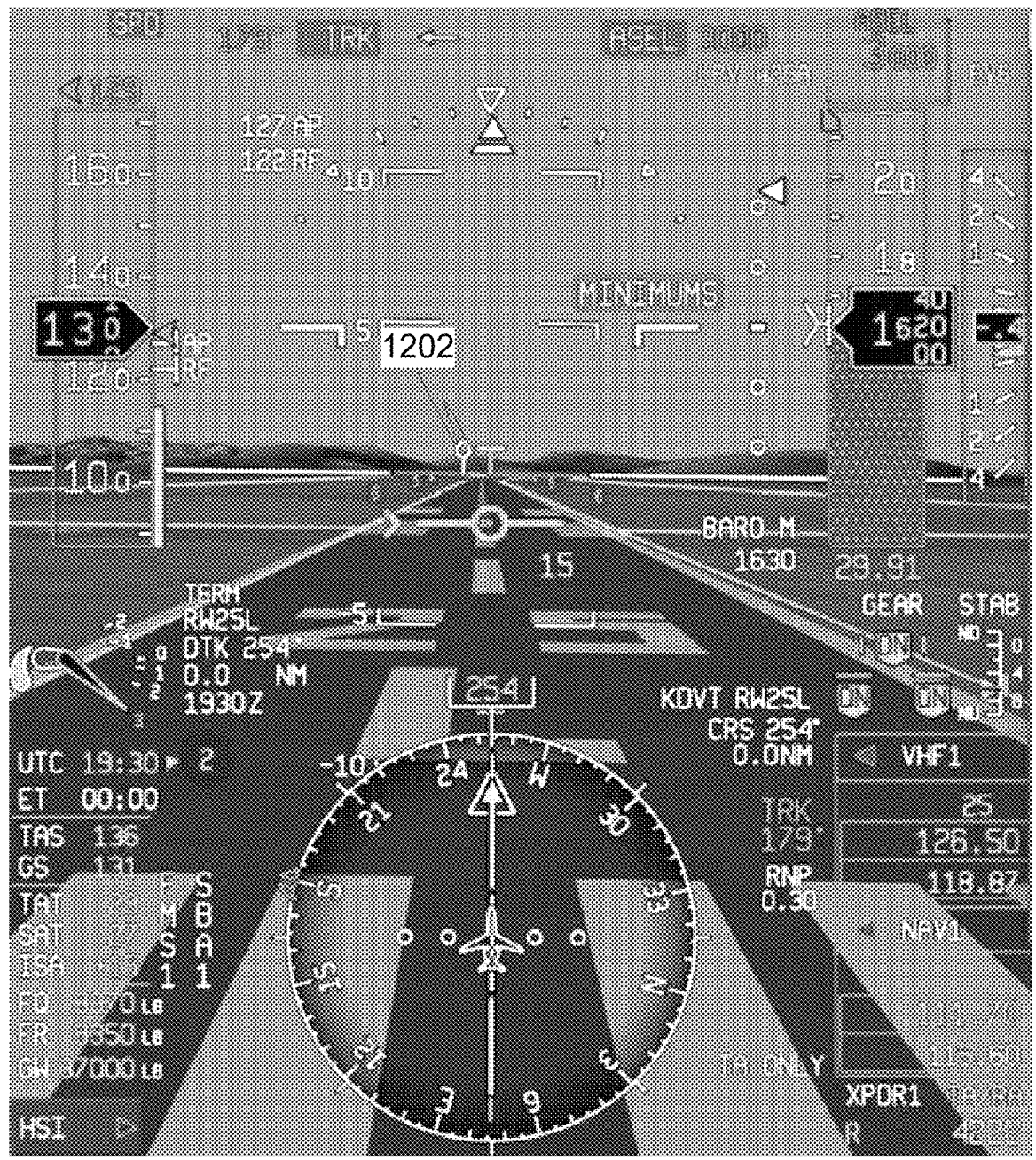

FIG. 11 illustrates the display on an SVS display of an example 3-D object 1102 that is 7000 feet from the view point with only an inverse linear projection function applied for sizing. FIG. 12 illustrates the display on an SVS display of the same example 3-D object 1202 that is 7000 feet from the view point with both an inverse linear projection function and a compensation scaling function applied for sizing. In this example, the object 1202 is displayed larger than the object 1102 since the objects are further away from the aircraft.

Figure 13A:
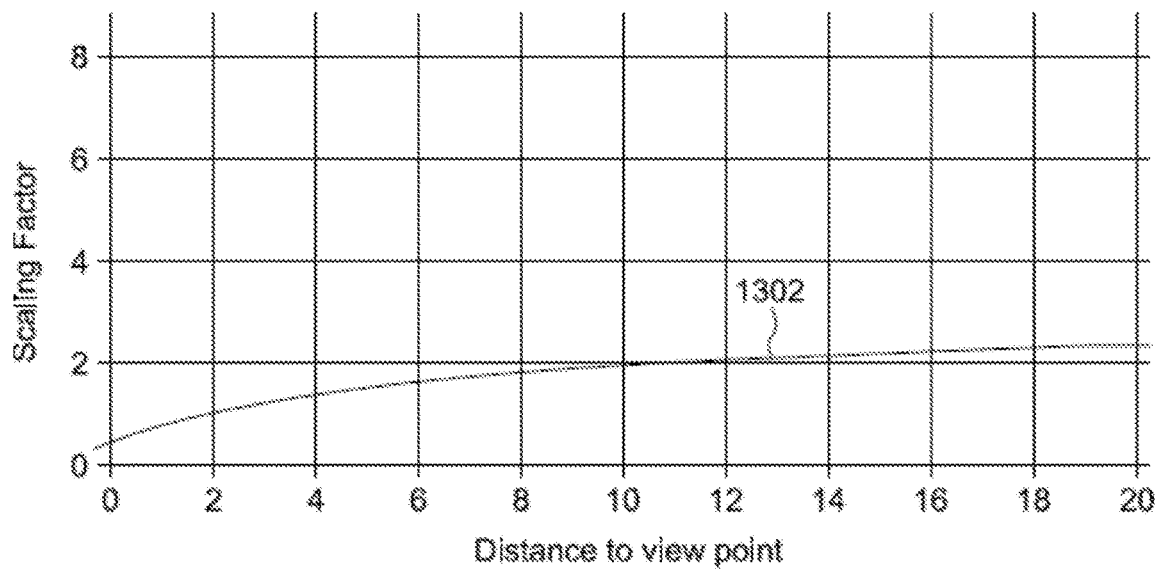
FIGS. 13A and 14A are diagrams depicting an example graph of a scaling factor versus distance of object to view point for an example compensation scaling function, in accordance with some embodiments.
Figure 13B:
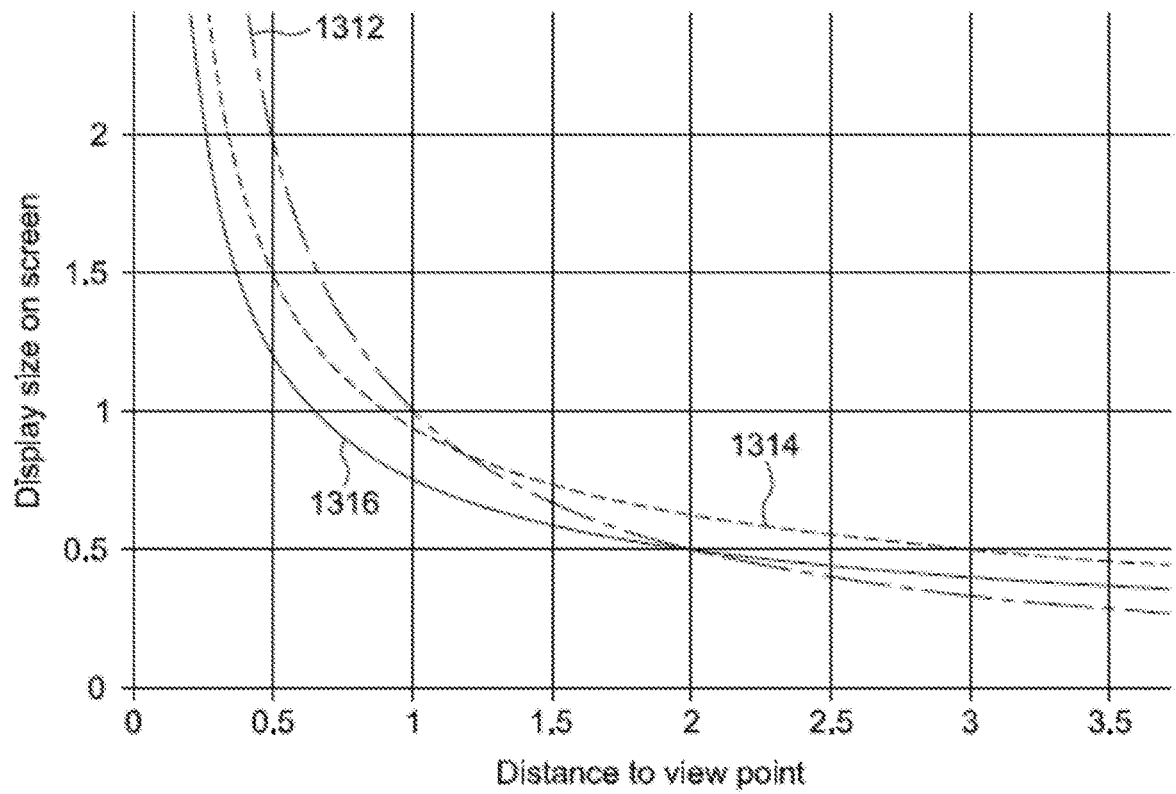
FIGS. 13B and 14B are diagrams depicting example graphs of a display size on screen versus distance of object to view point when (i) only an example inverse linear projection is used, (ii) an example inverse linear projection function plus a first example compensation scaling function is used, and (iii) an example inverse linear projection function plus an second example compensation scaling function is used, in accordance with some embodiments.
Figure 14A:
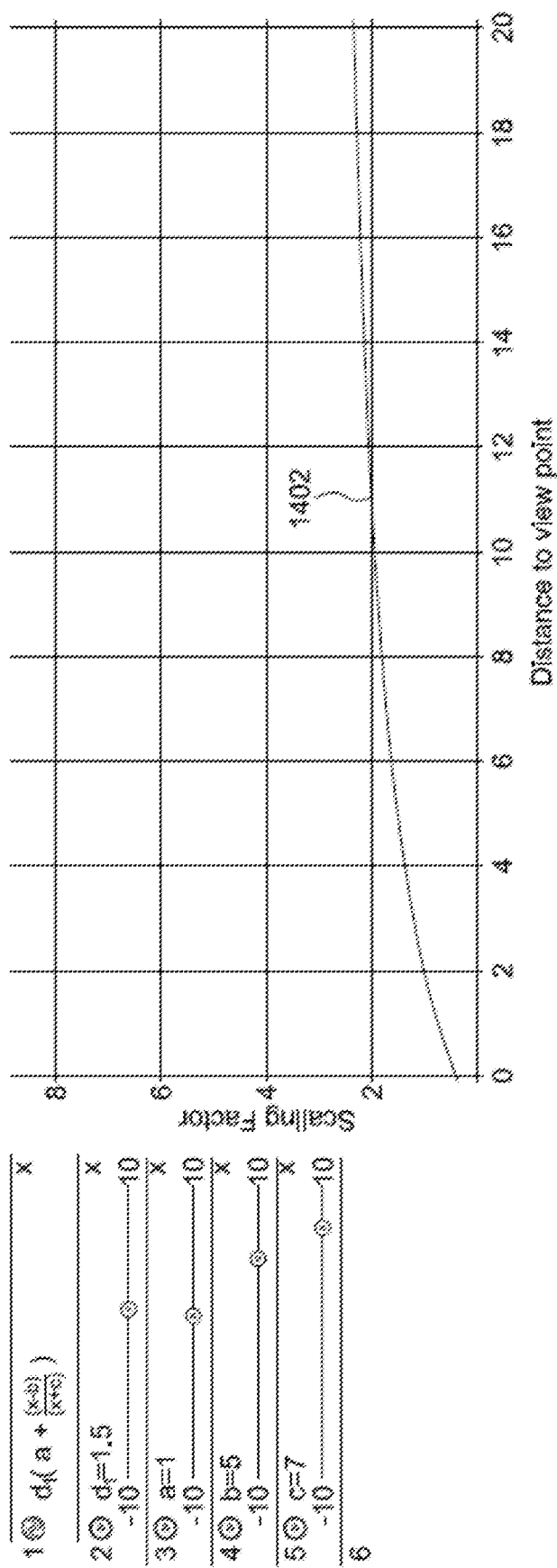
Figure 14B:
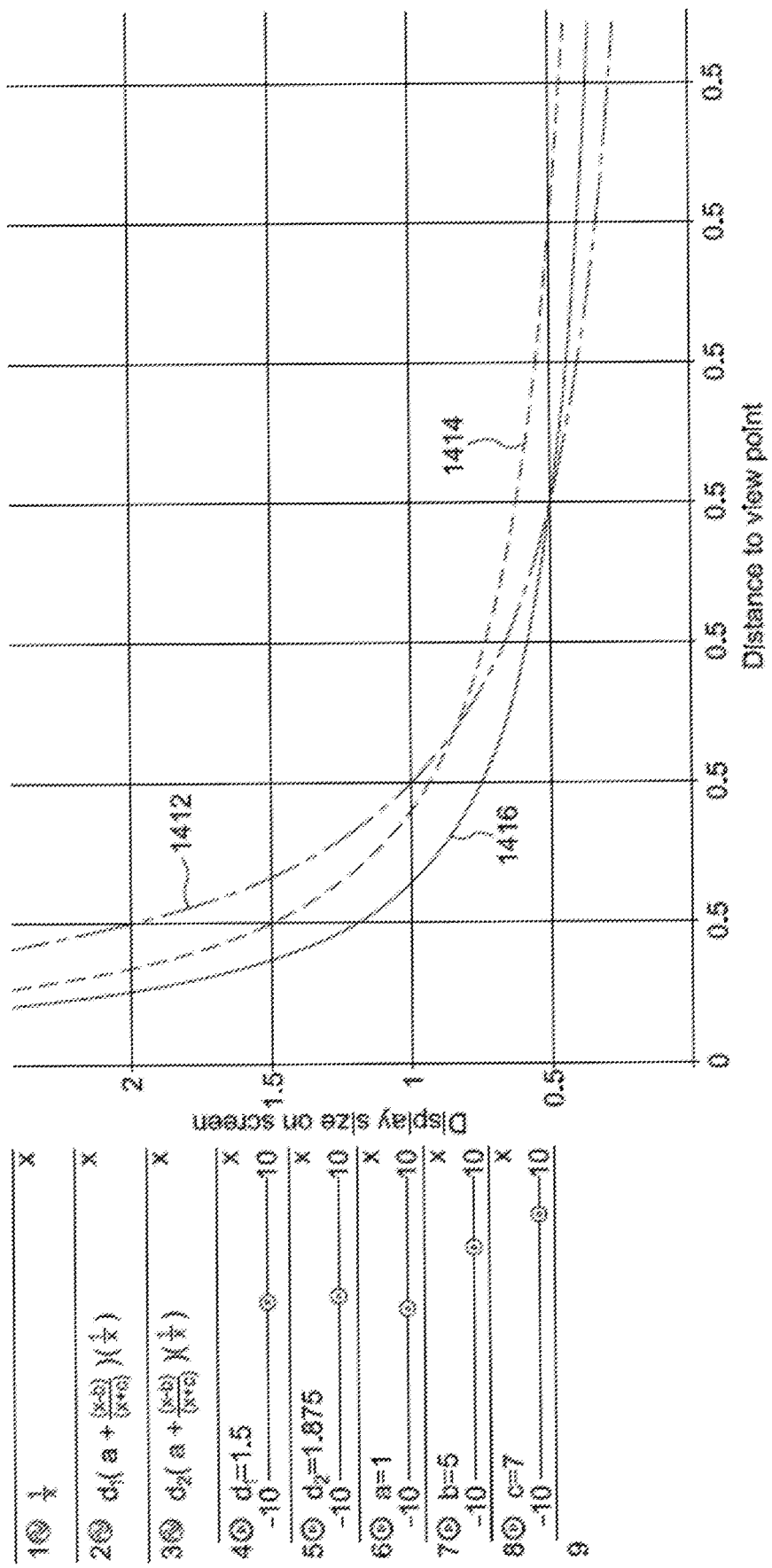

FIGS. 13A and 14A are diagrams depicting example graphs of scaling factor versus distance of an object to a view point for example compensation scaling functions. FIGS. 13B and 14B are diagrams depicting example graphs of display size on screen versus distance of an object to a view point when (i) only an example inverse linear projection is used (at 1312, 1412), (ii) an example inverse linear projection function plus a first example compensation scaling function is used (at 1314, 1414), e.g., for normal conditions, and (iii) an example inverse linear projection function plus an second example compensation scaling function is used (at 1316, 1416), e.g., for an alert or bad visual conditions.

Figure 15:
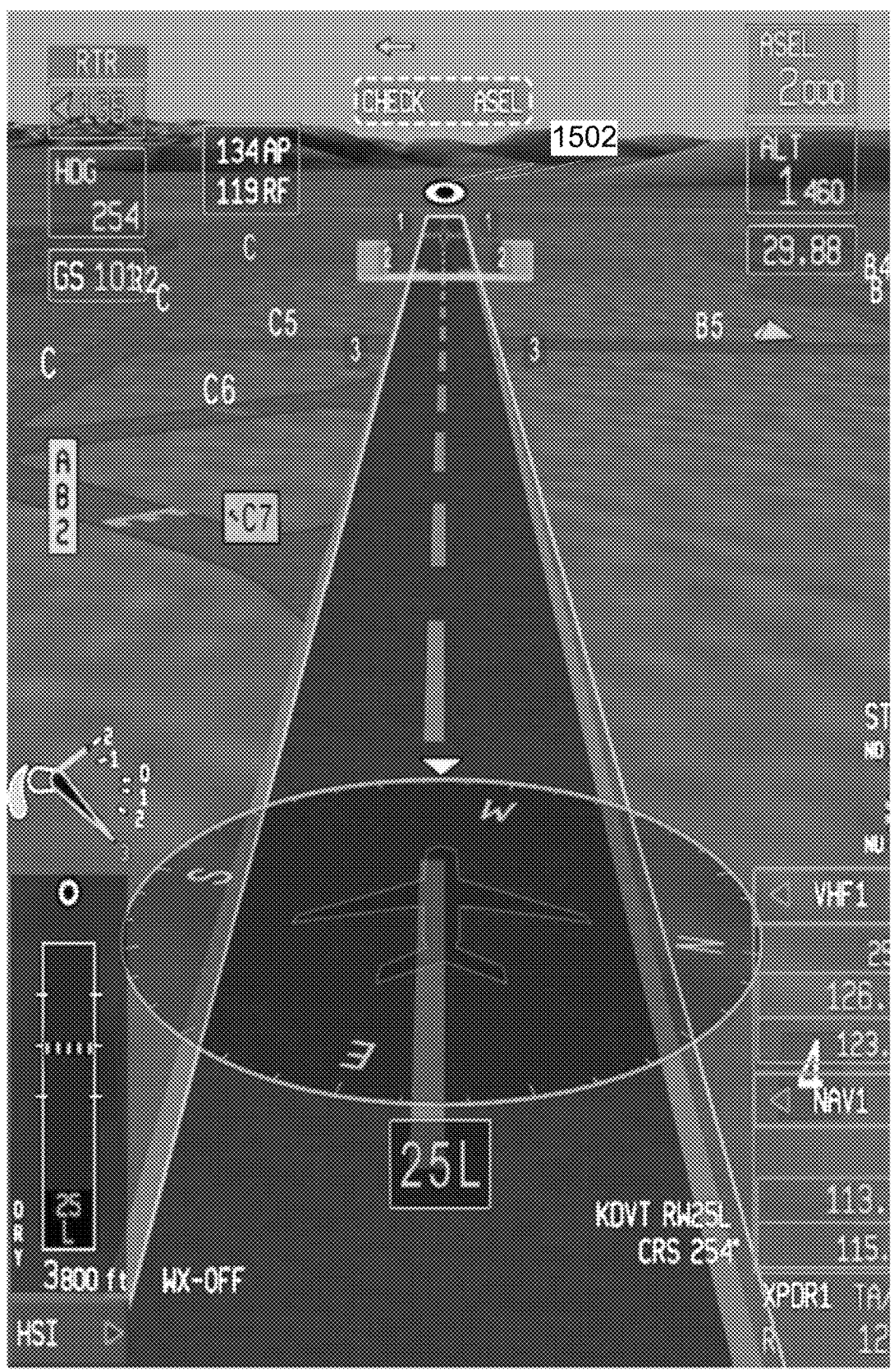
FIGS. 15 and 16 are diagrams depicting a calculated virtual object around the travel path of an aircraft overlaid on a 3-D view in front of the aircraft, with non-linear scaling applied for sizing the calculated virtual object, in accordance with some embodiments.
Figure 16:
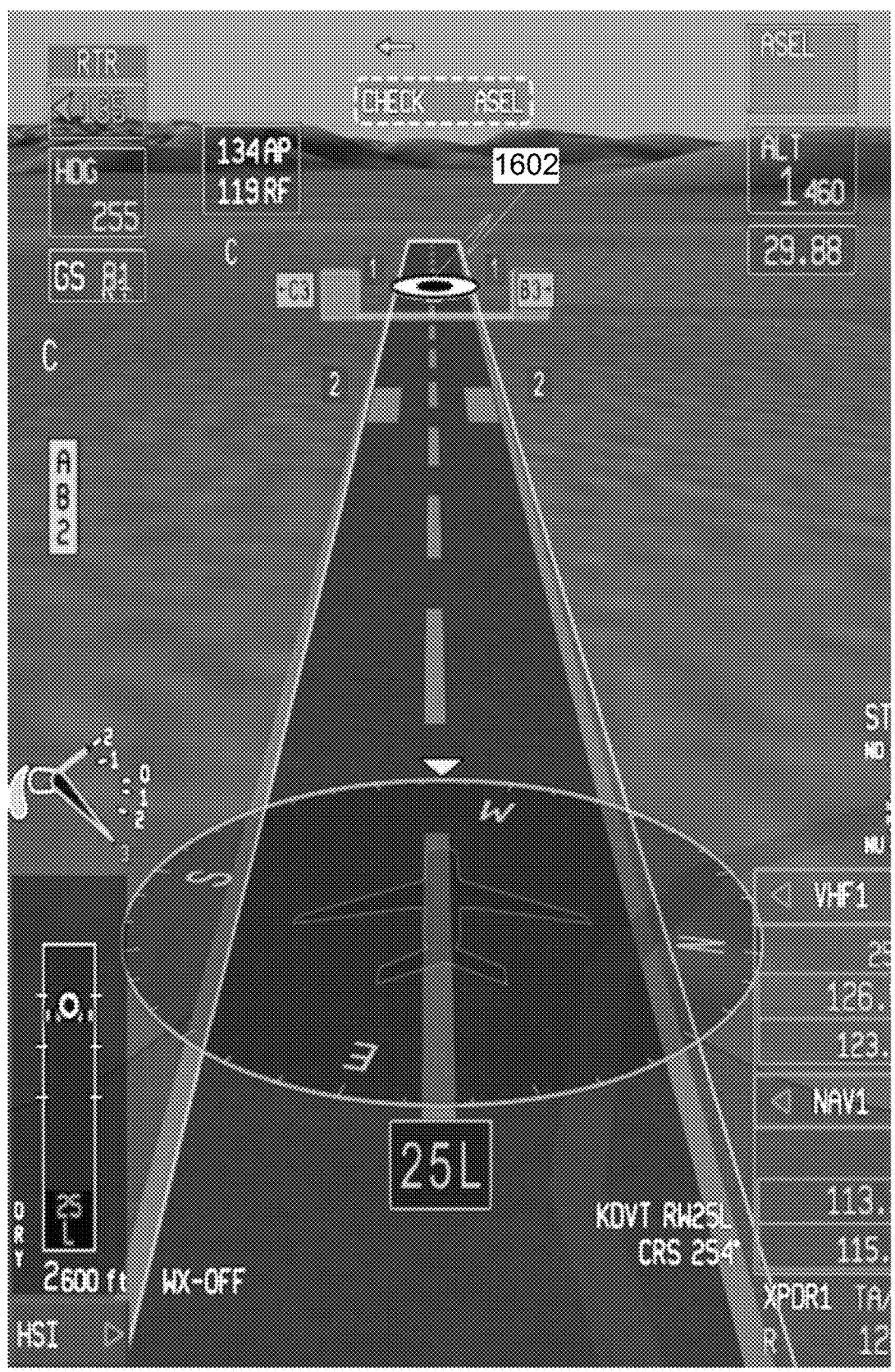

FIGS. 15 and 16 are diagrams depicting a calculated virtual object around the travel path of an aircraft that is overlaid on a 3-D view in front of the aircraft, with non-linear scaling applied for sizing the calculated virtual object. FIG. 15 illustrates the display on an SVS display of an example calculated virtual 3-D object 1502 that is in front of the view point with both an inverse linear projection function and a compensation scaling function applied for sizing. FIG. 16 illustrates the display on an SVS display of an example calculated virtual 3-D object 1602 that is in front of the view point with both an inverse linear projection function and a compensation scaling function applied for sizing.

In one embodiment, a display system for displaying a three-dimensional view in front of an aerial vehicle is disclosed. The display system comprises a display screen for displaying the three-dimensional view, one or more sensors for obtaining object data regarding objects within the travel path of the aerial vehicle, and a controller for receiving the object data from the one or more sensors and for providing input to the display screen. The controller is configured by programming instructions on non-transitory computer readable media to: cause the display of one or more objects as graphical objects in a 3-dimensional graphical representation of real space, wherein the display size of an object is determined based on a non-linear projection per distance between the object and view point that is scaled based on a continuous, non-linear scaling function, which causes the object to be displayed smaller at certain distances and larger at other distances than it would if only linear scaling (e.g., inverse linear scaling performed by an inverse linear function) were applied. This may allow the display size of the object to not be too big when the object is close to the aerial vehicle and to not be too small when the object is far away from the aerial vehicle.

In one embodiment of the display system, the continuous, non-linear scaling function comprises one of a plurality of different compensation scaling functions.

In one embodiment of the display system, the plurality of different compensation scaling functions comprises a first compensation scaling function for normal conditions and a second compensation scaling function for alert or bad visual conditions.

In one embodiment of the display system, the first compensation scaling function used to calculate a scaling factor for a specific distance x comprises $d_1(a+(d*x-b)/(e*x+c))$, wherein $d_1$, a, b, c, d and e are constants and x is the distance from the object to the view point.

In one embodiment of the display system, the second compensation scaling function used to calculate a scaling factor for a specific distance x comprises $d_2(a+(d*x-b)/(e*x+c))$, wherein $d_2$, a, b, c, d and e are constants, $d_2$ is not equal to $d_1$, and x is the distance from the object to the view point.

In one embodiment of the display system, $d_2 > d_1$, thereby causing the display size of objects at a certain distance to be larger when the second compensation scaling function versus when the first compensation scaling function is used.

In one embodiment of the display system, the display size of an object is determined by an inverse linear projection scaling function plus one of the plurality of different compensation scaling functions.

In one embodiment of the display system, the inverse linear projection scaling function comprises $1/x$, where x is the distance from the object to the view point.

In one embodiment of the display system, the display system is a flight deck display system on board an aerial vehicle.

In one embodiment of the display system, the flight deck display system comprises a primary flight display (PFD).

In one embodiment of the display system, the display comprises a synthetic vision system displayed on a PFD.

In one embodiment of the display system, the display system is further configured to detect a threat level posed by the object and adjust the position of the object on the display based on the determined threat level.

In one embodiment of the display system, to adjust the position of the object on the display based on the determined threat level, the system is configured to adjust the position of the object further away from the center of the projected travel path of the aerial vehicle when the threat level is considered low.

In one embodiment of the display system, to adjust the position of the object on the display based on the determined threat level, the system is configured to adjust the position of the object closer to the center of the projected travel path of the aerial vehicle when the threat level is considered high.

In one embodiment of the display system, the travel path of the aerial vehicle is along a runway and wherein, to adjust the position of the object on the display based on the determined threat level, the system is configured to adjust the position of the object further away from the center of the runway when the threat level is considered low.

In one embodiment of the display system, to adjust the position of the object on the display based on the determined threat level, the system is configured to adjust the position of the object closer to the center of the runway when the threat level is considered high.

In another embodiment, a method for displaying objects in the travel path of an aerial vehicle is disclosed. The method comprises: obtaining object data regarding sensed objects around the travel path of the aerial vehicle from one or more aerial vehicle sensors; determining if the sensed objects are within a field of view of a three-dimensional view in front of the aerial vehicle displayed on a display screen in the aerial vehicle; selecting, for each graphical object representing an object within the field of view of the three-dimensional view, a graphical object display size for the object, wherein the display size of an object is determined based on a non-linear projection per distance between the object and the view point that is scaled based on a continuous, non-linear scaling function, which causes the object to be displayed smaller at certain distances and larger at other distances than it would if only linear scaling (e.g., inverse linear scaling performed by an inverse linear function) were applied, wherein the display size of the object is not too big when the object is nearby to the aerial vehicle and not too small when the object is far away; causing the display on the display screen of the one or more graphical objects with the selected display size.

In one embodiment of the method, the method further comprises detecting a threat level posed by the object and adjusting the position of the object on the display based on the determined threat level.

In one embodiment of the method, the adjusting comprises adjusting the position of the object further away from the center of the projected travel path of the aerial vehicle when the threat level is considered low.

In one embodiment of the method, the adjusting further comprises adjusting the position of the object closer to the center of the projected travel path of the aerial vehicle when the threat level is considered high.

In one embodiment of the method, the travel path of the aerial vehicle is along a runway and wherein the adjusting further comprises adjusting the position of the object further away from the center of the runway when the threat level is considered low.

In one embodiment of the method, the adjusting further comprises adjusting the position of the object closer to the center of the runway when the threat level is considered high.

In one embodiment of the method, the continuous, non-linear scaling function comprises one of a plurality of different compensation scaling functions.

In one embodiment of the method, the plurality of different compensation scaling functions comprises a first compensation scaling function for normal conditions and a second compensation scaling function for alert or bad visual conditions.

In one embodiment of the method, the first compensation scaling function used to calculate a scaling factor for a specific distance x comprises $d_1(a+(d*x-b)/(e*x+c))$, wherein $d_1$, a, b, c, d and e are constants and x is the distance from the object to the view point.

In one embodiment of the method, the second compensation scaling function used to calculate a scaling factor for a specific distance x comprises $d_2(a+(d*x-b)/(e*x+c))$, wherein $d_2$, a, b, c, d and e are constants, $d_2$ is not equal to $d_1$, and x is the distance from the object to the view point.

In one embodiment of the method, $d_2 > d_1$, thereby causing the display size of objects at a certain distance to be larger when the second compensation scaling function versus when the first compensation scaling function is used.

In one embodiment of the method, the display size of an object is determined by an inverse linear projection scaling function plus one of the plurality of different compensation scaling functions.

In one embodiment of the method, the inverse linear projection scaling function comprises 1/x, where x is the distance from the object to the view point.

In another embodiment, a method for displaying objects in the travel path of an aerial vehicle is disclosed. The method comprises: obtaining object data regarding a calculated virtual object around the travel path of the aerial vehicle from one or more aerial vehicle sensors; determining if the calculated virtual object is within a field of view of a three-dimensional view in front of the aerial vehicle displayed on a display screen in the aerial vehicle; selecting, for a graphical object representing the calculated virtual object within the field of view of the three-dimensional view, a graphical object display size for the object, wherein the display size of an object is determined based on a non-linear projection per distance between the object and the view point that is scaled based on a continuous, non-linear scaling function, which causes the object to be displayed smaller at certain distances and larger at other distances than it would if only linear scaling (e.g., inverse linear scaling performed by an inverse linear function) were applied, wherein the display size of the object is not too big when the object is nearby the aerial vehicle and not too small when the object is far away; and causing the display on the display screen of the graphical object with the selected display size.

These aspects and other embodiments may include one or more of the following features. The method may further comprise detecting a threat level posed by the object and adjusting the position of the object on the display based on the determined threat level. The adjusting may further comprise adjusting the position of the object further away from the center of the projected travel path of the aerial vehicle when the threat level is considered low. The adjusting may further comprise adjusting the position of the object closer to the center of the projected travel path of the aerial vehicle when the threat level is considered high. The travel path of the aerial vehicle may be along a runway and the adjusting may further comprise adjusting the position of the object further away from the center of the runway when the threat level is considered low. The adjusting may further comprise adjusting the position of the object closer to the center of the runway when the threat level is considered high. The continuous, non-linear scaling function may comprise one of a plurality of different compensation scaling functions. The plurality of different compensation scaling functions may comprise a first compensation scaling function for normal conditions and a second compensation scaling function for alert or bad visual conditions. The first compensation scaling function used to calculate a scaling factor for a specific distance x may comprise $d_1(a+(d*x-b)/(e*x+c))$, wherein $d_1$, a, b, c, d and e are constants and x is the distance from the object to the view point. The second compensation scaling function used to calculate a scaling factor for a specific distance x may comprise $d_2(a+(d*x-b)/(e*x+c))$, wherein $d_2$, a, b, c, d and e are constants, $d_2$ is not equal to $d_1$, and x is the distance from the object to the view point. $d_2$ may be greater $d_1$, thereby causing the display size of objects at a certain distance to be larger when the second compensation scaling function versus when the first compensation scaling function is used. The display size of an object may be determined by an inverse linear projection scaling function plus one of the plurality of different compensation scaling functions. The inverse linear projection scaling function may comprise 1/x, where x is the distance from the object to the view point.

In another embodiment, non-transitory computer readable media encoded with processor executable programming instructions is disclosed. When the processor executable programming instructions are executed by a processor, a method is performed. The method comprises: obtaining object data regarding sensed objects around the travel path of the aerial vehicle from one or more aerial vehicle sensors; determining if the sensed objects are within a field of view of a three-dimensional view in front of the aerial vehicle displayed on a display screen in the aerial vehicle; selecting, for each graphical object representing an object, a graphical object display size for the object, wherein the display size of an object is determined based on a non-linear projection per distance between the object and the view point that is scaled based on a continuous, non-linear scaling function, which causes the object to be displayed smaller at certain distances and larger at other distances than it would if only linear scaling (e.g., inverse linear scaling performed by an inverse linear function) were applied, wherein the display size of the object is not too big when the object is nearby the aerial vehicle and not too small when the object is far away; and causing the display of the one or more graphical objects on the display screen.

These aspects and other embodiments may include one or more of the following features. The method may further comprise detecting a threat level posed by the object and adjusting the position of the object on the display based on the determined threat level. The adjusting may further comprise adjusting the position of the object further away from the center of the projected travel path of the aerial vehicle when the threat level is considered low. The adjusting may further comprise adjusting the position of the object closer to the center of the projected travel path of the aerial vehicle when the threat level is considered high. The travel path of the aerial vehicle may be along a runway and the adjusting may further comprise adjusting the position of the object further way from the center of the runway when the threat level is considered low. The adjusting may further comprise adjusting the position of the object closer to the center of the runway when the threat level is considered high. The continuous, non-linear scaling function may comprise one of a plurality of different compensation scaling functions. The plurality of different compensation scaling functions may comprise a first compensation scaling function for normal conditions and a second compensation scaling function for alert or bad visual conditions. The first compensation scaling function used to calculate a scaling factor for a specific distance x may comprise $d_1(a+(d*x-b)/(e*x+c))$, wherein $d_1$, a, b, c, d and e are constants and x is the distance from the object to the view point. The second compensation scaling function used to calculate a scaling factor for a specific distance x may comprise $d_2(a+(d*x-b)/(e*x+c))$, wherein $d_2$, a, b, c, d and e are constants, $d_2$ is not equal to $d_1$, and x is the distance from the object to the view point. $d_2$ may be greater $d_1$, thereby causing the display size of objects at a certain distance to be larger when the second compensation scaling function versus when the first compensation scaling function is used. The display size of an object may be determined by an inverse linear projection scaling function plus one of the plurality of different compensation scaling functions. The inverse linear projection scaling function may comprise 1/x, where x is the distance from the object to the view point.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for displaying a three-dimensional view in front of an aerial vehicle, the display system comprising:
    a display screen for displaying the three-dimensional view;
    one or more sensors for obtaining object data regarding objects within a travel path of the aerial vehicle; and
    a controller for receiving the object data from the one or more sensors, and for providing input to the display screen, the controller configured by programming instructions on non-transitory computer readable media to:
        cause one or more objects to be displayed as graphical objects in a 3-dimensional graphical representation of real space, wherein a display size of an object is determined based on a non-linear projection per distance between the object and a view point that is scaled based on a continuous, non-linear scaling function, which causes the object to be displayed smaller at certain distances and larger at other distances than it would if only linear scaling were applied;
        detect a threat level posed by the object; and
        adjust a position of the object on the display screen based on the determined threat level.

2. The display system of claim 1 wherein the continuous, non-linear scaling function comprises one of a plurality of different compensation scaling functions comprising a first compensation scaling function for normal conditions and a second compensation scaling function for alert or bad visual conditions.

3. The display system of claim 2 wherein the first compensation scaling function used to calculate a scaling factor for a specific distance x comprises $d_1(a+(d*x-b)/(e*x+c))$, wherein $d_1$, a, b, c, d and e are constants and x is the distance from the object to the view point.

4. The display system of claim 3 wherein the second compensation scaling function used to calculate a scaling factor for a specific distance x comprises $d_2(a+(d*x-b)/(e*x+c))$, wherein $d_2$, a, b, c, d and e are constants, $d_2$ is not equal to $d_1$, and x is the distance from the object to the view point.

5. The display system of claim 4, wherein d2>d1, thereby causing the display size of objects at a certain distance to be larger when the second compensation scaling function versus when the first compensation scaling function is used.

6. The display system of claim 2, wherein the display size of an object is determined by an inverse linear projection scaling function plus one of the plurality of different compensation scaling functions.

7. The display system of claim 1, wherein, to adjust the position of the object on the display screen based on the determined threat level, the system is configured to adjust the position of the object further away from a center of the projected travel path of the aerial vehicle when the threat level is considered low.

8. The display system of claim 7, wherein, to adjust the position of the object on the display screen based on the determined threat level, the system is configured to adjust the position of the object closer to the center of the projected travel path of the aerial vehicle when the threat level is considered high.

9. The display system of claim 7, wherein the travel path of the aerial vehicle is along a runway and wherein, to adjust the position of the object on the display screen based on the determined threat level, the system is configured to adjust the position of the object further away from a center of the runway when the threat level is considered low.

10. The display system of claim 8, wherein, to adjust the position of the object on the display screen based on the determined threat level, the system is configured to adjust the position of the object closer to the center of the runway when the threat level is considered high.

11. A method for displaying objects in a travel path of an aerial vehicle, the method comprising:
obtaining object data regarding sensed objects around the travel path of the aerial vehicle from one or more aerial vehicle sensors;
determining if the sensed objects are within a field of view of a three-dimensional view in front of the aerial vehicle displayed on a display screen in the aerial vehicle;
selecting, for each graphical object representing an object within the field of view of the three-dimensional view, a graphical object display size for the object, wherein the display size of an object is determined based on a non-linear projection per distance between the object and a view point that is scaled based on a continuous, non-linear scaling function, which causes the object to be displayed smaller at certain distances and larger at other distances than it would if only linear scaling were applied;
causing the one or more graphical objects to be displayed on the display screen with the selected display size;
detecting a threat level posed by the object; and
adjusting a position of the object on the display screen based on the determined threat level.

12. The method of claim 11, wherein the adjusting comprises adjusting the position of the object further away from a center of the projected travel path of the aerial vehicle when the threat level is considered low.

13. The method of claim 12, wherein the adjusting further comprises adjusting the position of the object closer to the center of the projected travel path of the aerial vehicle when the threat level is considered high.

14. The method of claim 12, wherein the travel path of the aerial vehicle is along a runway and wherein the adjusting further comprises adjusting the position of the object further away from a center of the runway when the threat level is considered low.

15. The method of claim 14, wherein the adjusting further comprises adjusting the position of the object closer to the center of the runway when the threat level is considered high.

16. The method of claim 11 wherein the continuous, non-linear scaling function comprises one of a plurality of different compensation scaling functions comprising a first compensation scaling function for normal conditions and a second compensation scaling function for alert or bad visual conditions.

17. The method of claim 16 wherein:
the first compensation scaling function used to calculate a scaling factor for a specific distance x comprises $d_1(a+(d*x-b)/(e*x+c))$, wherein $d_1$, a, b, c, d and e are constants and x is the distance from the object to the view point; and
the second compensation scaling function used to calculate a scaling factor for a specific distance x comprises $d_2(a+(d*x-b)/(e*x+c))$, wherein $d_2$ is greater than $d_1$, thereby causing the display size of objects at a certain distance to be larger when the second compensation scaling function versus when the first compensation scaling function is used.

18. A method for displaying objects in a travel path of an aerial vehicle, the method comprising:
obtaining object data regarding a calculated virtual object around the travel path of the aerial vehicle from one or more aerial vehicle sensors;
determining if the calculated virtual object is within a field of view of a three-dimensional view in front of the aerial vehicle displayed on a display screen in the aerial vehicle;
selecting, for a graphical object representing the calculated virtual object within the field of view of the three-dimensional view, a graphical object display size for the graphical object, wherein the display size of a graphical object is determined based on a non-linear projection per distance between the graphical object and a view point that is scaled based on a continuous, non-linear scaling function, which causes the graphical object to be displayed smaller at certain distances and larger at other distances than it would if only linear scaling were applied;
causing the graphical object to be displayed on the display screen with the selected display size;
detecting a threat level posed by the virtual object; and
adjusting a position of the graphical object on the display screen based on the determined threat level.

19. The method of claim 18, wherein the adjusting comprises adjusting the position of the graphical object further a wav from a center of the projected travel path of the aerial vehicle when the threat level is considered low, and adjusting the position of the graphical object closer to the center of the projected travel path of the aerial vehicle when the threat level is considered high.

20. The method of claim 19, wherein the travel path of the aerial vehicle is along, a runway, the adjusting further comprises adjusting the position of the graphical object further away from a center of the runway when the threat level is considered low, and the adjusting further comprises adjusting the position of the graphical object closer to the center of the runway when the threat level is considered high.

* * * * *